Sept. 22, 1931. W. B. PINE 1,824,684
APPARATUS FOR MAKING VITRIFIED ARGILLACEOUS PRODUCTS
Filed July 22, 1930 2 Sheets-Sheet 2
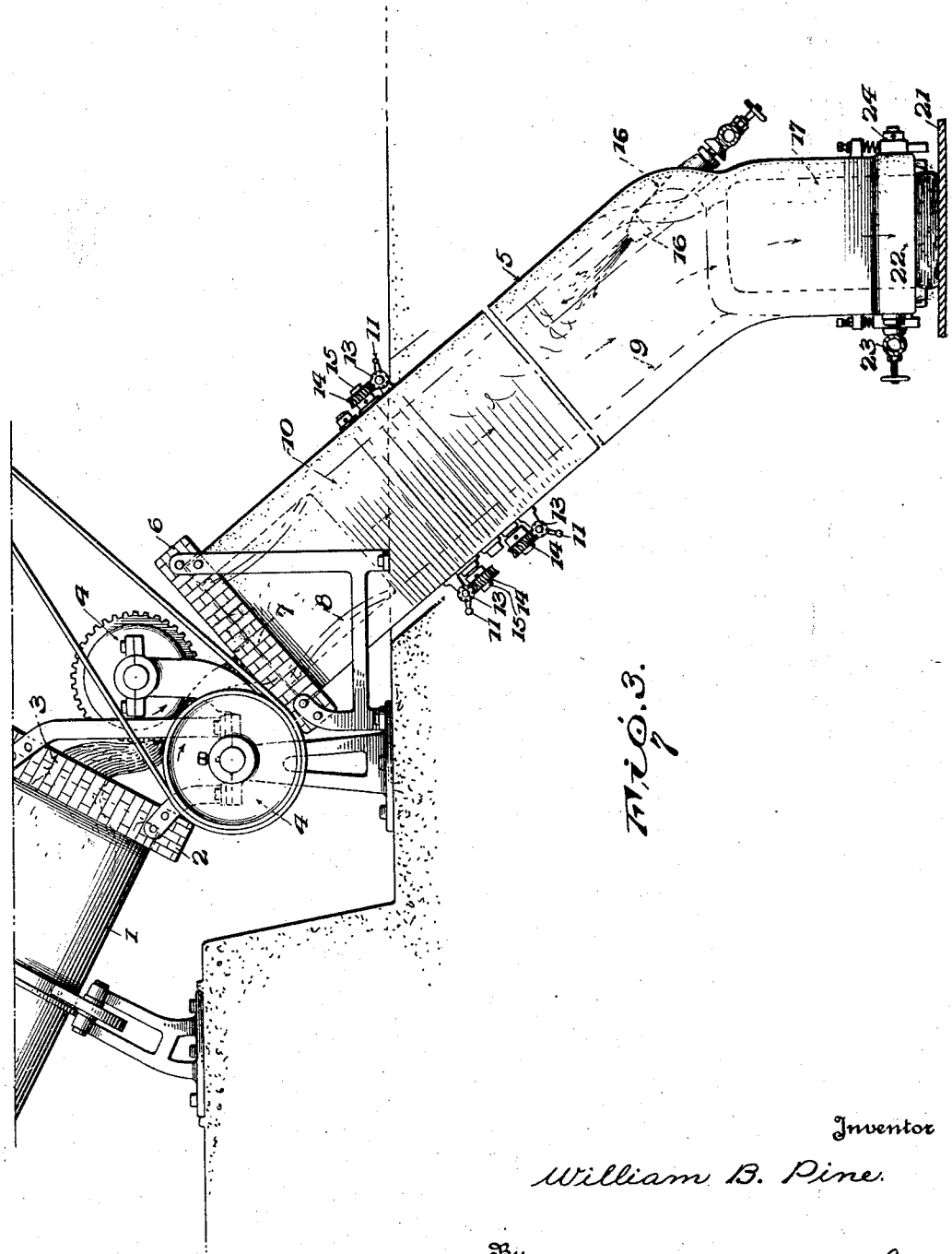
Inventor
William B. Pine.
By Cameron, Kerkam & Sutton
Attorneys Patented Sept. 22, 1931

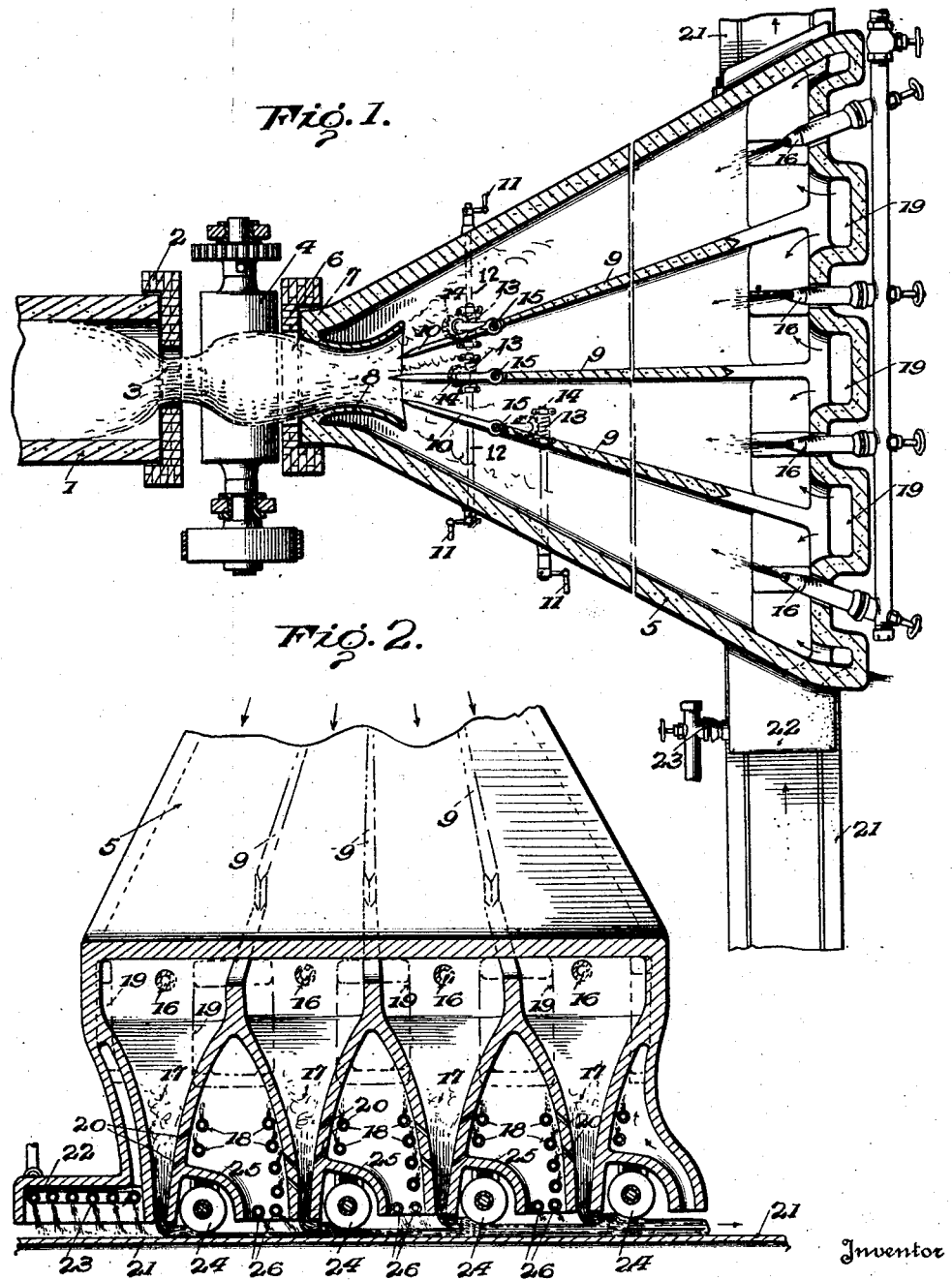

1,824,684

UNITED STATES PATENT OFFICE

WILLIAM B. PINE, OF OKMULGEE, OKLAHOMA

APPARATUS FOR MAKING VITRIFIED ARGILLACEOUS PRODUCTS

Application filed July 22, 1930. Serial No. 469,904.

This invention relates to a process of and apparatus for the manufacture of molded products from argillaceous materials, particularly clays and shales.

It has been discovered that argillaceous materials, such as clay, shale and the like, when heated to a temperature at which said materials are plastic or semi-plastic but not completely fused, may be compacted and densified by the application of pressure while so heated and molded to form products having uniform composition and texture and being dense, hard, tough and rock-like. The starting materials which are suitable for use in this manner include broadly argillaceous materials such as clay or shale of many varieties, either alone or mixed with other ingredients to aid or increase the properties in which the clay or shale may be deficient. These materials, which may if desired be first crushed, ground or pulverized to any suitable degree, are heated to a temperature at which they become plastic or semi-plastic but are not completely fused, and while so heated are molded to any desired shape, preferably under pressure which may be applied in any suitable manner as by means of suitable rollers, dies or the like. The application of pressure compacts the hot material, decreasing the porosity of the resultant product and increasing its hardness and density.

When these materials are heated, a somewhat loose mass of plastic or semi-plastic material is obtained which is full of voids varying in size from minute spaces to relatively large air pockets. In order to produce a product which is non-porous, hard, dense and compact, the hot materials must be compacted and the voids therein eliminated during or before the molding operation while the materials are maintained in a hot plastic or semi-plastic state. These voids may be eliminated to a large extent by mechanically working or manipulating the hot materials prior to the molding operation, as by kneading or rolling operations, and also by molding the hot materials under pressure to the desired final form, and in many instances these operations will be sufficient to produce a final product having the desired characteristics. The extent of densification of the mass of materials obtained by molding them under pressure, however, depends to some extent on the thickness of material to be molded and where a thick mass of material is to be molded to form, for example, large heavy articles such as paving blocks, structural beams and building blocks, and the like, it is difficult to obtain by a single molding operation the desired densification throughout the thickness of the mass of material under treatment. Where too much pressure is required, or too high a temperature, difficulties in maintaining and operating equipment are encountered and cost is increased. Moreover, it is desirable to keep the temperature of the materials as low as possible in order that as few of the materials as possible be fused.

One of the objects of the present invention is to provide a novel process and apparatus for making molded argillaceous products whereby a relatively thick mass of heated material is molded into a desired shape with uniform densification of the material throughout the thickness of the completed product.

Another object is to provide a process and apparatus for making a relatively thick molded argillaceous product whereby relatively thin portions of a mass of heated materials are individually molded, compacted or densified and are simultaneously united or welded to other portions of the mass.

Another object is to provide a process and apparatus for making a relatively thick molded argillaceous product whereby less pressure is required and lower temperatures employed than heretofore necessary.

Another object is to provide a continuous process and apparatus particularly adapted for manufacturing heavy elements such as paving blocks, structural beams and blocks and the like whereby a mass of material to form the desired article is distributed in portions which are individually molded and compacted and simultaneously joined or welded integrally with previously molded portions of the mass.

A further object is to provide novel means for distributing a mass of plastic materials into portions and separately feeding said portions.

With the above objects in view, the invention generally stated includes a process for making relatively thick articles of molded argillaceous material, wherein a mass of material to form said articles is heated and distributed into relatively thin portions that are individually rolled or otherwise suitably compacted and densified while each portion is joined or welded integrally with previously molded portions by the densifying operation, and an apparatus for carrying out said process. By this means the materials are molded and compacted in thin sections, so that the densifying action of the application of pressure to the materials is increased and uniform densification is produced, while the densified sections are joined or welded integrally to build up the completed article. By rolling the materials in thin sections, less pressure is required than when the said materials are rolled as an integral mass, so that lighter rollers and equipment may be employed. Furthermore, the materials may be satisfactorily molded at lower temperatures, so that the amount of heat required is reduced and fewer of the elements are fused or partially fused.

One form of apparatus embodying the invention has been illustrated in the drawings, and one embodiment of the process is described hereinafter in connection therewith, but it is to be expressly understood that said drawings are for purposes of illustration only and are not to be construed as a definition of the limits of the invention, reference being had to the appended claims for this purpose.

In said drawings,

Fig. 1 is a sectional plan view of an apparatus embodying the invention;

Fig. 2 is an end view partly in section of the apparatus shown in Fig. 1; and

Fig. 3 is a side elevation of said apparatus.

The argillaceous materials to be treated may be heated in any suitable manner, and to this end a rotary kiln of any desirable type may be employed, a portion of said kiln being shown at 1 and being provided with a suitable end door 2 in which is an opening 3 for the passage of the hot materials. Where it is desired that the materials be mechanically worked to reduce voids therein, any suitable mechanical device such as a pair of rolls 4 may receive the hot materials discharged from the kiln 1 to compact and densify the same. It will be understood, however, that the apparatus hereinafter described may be used with any suitable heating means and with or without mechanical working devices such as rolls 4.

The hot materials, whether worked or not, are fed to an apparatus which distributes the mass of materials into separate portions and in the form shown, said distributing means takes the form of a fan-shaped pan 5 of suitable refractory material which is preferably inclined to the horizontal at an angle such that the hot materials will feed by gravity down the incline, although any suitable mechanical feeding means such as rakes or the like may be additionally employed. The upper end of the pan is closed by a suitable door 6 having an opening 7 therein through which the materials from the rolls 4 or kiln 1 pass into a throat 8. The materials leaving the throat 8 and feeding down the inclined pan are distributed into individual portions preferably by means of dividing or separating walls 9 which as shown form four separate passages for the materials, and these walls 9 may be provided with adjustable end portions 10 to regulate the amount of materials fed into each of the individual passages. As shown, said adjustable portions 10 are each controlled by means of a handle 11 secured to a shaft 12 carrying a worm 13 meshing with a worm gear 14 on a pin or shaft 15 on which the end portions 10 are mounted. The materials passing down the passages in the pan are kept hot by any suitable means such as burners 16 of any suitable type which are preferably positioned at the lower end of each passage.

At the lower ends of the inclined passages in the pan 5, the materials in each passage are discharged to a substantial vertical feeder 17. Preferably feeders 17 are of a type described and claimed in a co-pending application, Serial No. 469,905, filed of even date herewith, that is, they may be of restricted cross section adjacent their bottom portions and are of sufficient vertical extent that the loose materials are packed or compressed in the bottoms of the feeders due to their own weight. During their passage through the feeders 17, the materials are kept hot by suitable means such as burners 18 of any suitable type which supply heat externally to the walls of the feeders, the products of combustion from said burners perferably passing upwardly through conduits 19 and being delivered at the lower ends of the inclined passages where their available heat is added to that supplied by burners 16 to keep the materials descending the inclined passages in a hot plastic or semi-plastic state. Air and gases which collect in the hot materials in feeders 17 may escape through suitable openings 20 in the walls of said feeders that are inclined upwardly and outwardly to prevent the escape of the hot materials therethrough.

For purposes of illustration of the invention, the drawings show an embodiment of the process and apparatus designed to provide a relatively thick article in the form of a flat sheet or slab; accordingly, the hot materials are continuously discharged from feeders 17 onto a travelling support or surface indicated diagrammatically at 21 which may comprise a moving belt, trains of suitable molds or cars, etc. A heating chamber 22 provided with suitable burners or the like 23 heats the surface 21 before it receives the hot materials from the first feeder 17. As shown, feeders 17 may have a discharge opening which extends substantially the width of surface 21 but which may be considerably narrower in the direction of movement of said surface, so that the hot materials are laid out on said surface in thin sheets one on top of another. These relatively thin sections of material are individually compacted and densified by pressure applied in any suitable manner, as by means of a plurality of rollers 24 one roller being associated with each feeder 17 on the side thereof in the direction of movement of surface 21. Thus as each section of material is laid on the moving support 21, it is at once rolled under pressure to densify and compact the materials and at the same time to weld or join the top section to the previously rolled underneath section or sections of material. Rolls 24 are preferably shielded from burners 18 by suitable means such as walls 25, and an integral weld or union between the separate sections may be assured by heating the surface of one section of material immediately before laying another section of material thereon, as by means of suitable burners 26. These burners restore any heat lost by the materials during the rolling operation and insure that the materials are sufficiently hot and plastic to obtain a good weld between the sections.

The operation is as follows: The materials heated to a plastic or semi-plastic condition in kiln 1 after passing through rolls 4, where these are employed, enter the distributing pan 5 through opening 7 and throat 8. On leaving the throat 8 said materials are divided into separate portions by the walls 9, the adjustable end portions 10 of said walls being set to regulate the amount of material descending each of the inclined passages in said pan. During their passage down the pan, the materials are kept hot by heat supplied from burners 16 and from the products of combustion of burners 18 which pass into the pan through conduits 19.

On arriving at the lower end of the pan, the hot materials are discharged into the vertical feeders 17 wherein they are packed or compressed by their own weight to reduce or eliminate voids therein while being kept hot by heat supplied from burners 18, air and gases escaping from the materials through openings 20 in the walls of the feeders. From the feeders 17, the loose plastic materials are discharged and spread or laid out in superimposed thin sections on the travelling support 21 which is preliminarily heated by passing through heating chamber 22, and each section of material as it is discharged and spread out on the travelling surface is individually rolled to compact and densify the materials and to weld the sections together. A hot weld is insured by heating the surface of each previously rolled section by means of burners 26 immediately before placing another section of material thereon.

It will be seen that the compacting and densifying pressure is applied to the materials distributed in thin sections regardless of the ultimate thickness of the article to be formed. In this way the densifying action of the pressure is uniform and complete througout the thickness of the final article, and this with less pressure and lower temperatures. Moreover, a continuous operation not only densifies the materials by applying pressure thereto but the same pressure also welds the sections of material together and molds and shapes the final product. By the use of the apparatus described, this process can be carried out simply and economically, and products of uniform characteristics obtained. Because of the reduction in required pressure, lighter equipment may be used with a consequent saving in cost. Heat requirements are less as the materials can be molded in thin sections at lower temperatures.

While only single embodiments of the process and apparatus have been described and illustrated in the drawings, it is to be expressly understood that the invention is not limited thereto. For example, the number of sections of material into which the mass is divided may be either more or less than four as shown in the drawings, and the densifying and molding pressure may be applied to the materials in any suitable manner. As regards the process, the distributing, feeding and molding apparatus may be altered or other means substituted therefor, and the final product need not take the form of a flat sheet, as any suitable molding or shaping apparatus may be employed to produce any desired article for which the material is suited. Likewise the apparatus described may be modified and changes made in the form, details of construction and arrangement of the parts without departing from the spirit of the invention. Reference is therefore to be had to the appended claims for a definition of the limits of the invention.

What is claimed is:

1. A process for treating argillaceous materials which comprises heating a mass of said materials to a temperature at which it becomes somewhat plastic but not completely fused, distributing the hot mass into separate portions, separately densifying said portions by applying compacting pressure thereto while so heated, and welding the hot portions together.

2. A process for treating argillaceous materials which comprises heating a mass of said materials to a temperature at which it becomes somewhat plastic but not completely fused, distributing the hot mass into relatively thin portions, separately densifying said portions by applying compacting pressure individually thereto while so heated, and employing said compacting pressure to unite and mold said portions.

3. A process for making relatively thick articles of molded argillaceous material which comprises heating a mass of argillaceous material to a temperature at which it becomes somewhat plastic but not completely fused, distributing said hot mass into separate portions while maintaining its temperature, and densifying and uniting said hot portions by successively adding one portion to another while applying welding and densifying pressure.

4. A process for making molded articles of argillaceous material which consists in heating a mass of said material to a temperature at which it becomes somewhat plastic but not completely fused and, while maintaining said temperature, separating said mass into portions and densifying and uniting said portions into an integral mass by applying molding pressure to individual portions while in contact with other portions.

5. A process for making molded articles of argillaceous material which consists in heating a mass of said material to a temperature at which it becomes somewhat plastic but not completely fused and, while maintaining said temperature, separating said mass into portions and rolling said portions individually under pressure to mold and weld the same into an integral mass.

6. A process for making molded articles of argillaceous material which consists in heating a mass of said material to a temperature at which it becomes somewhat plastic but not completely fused, separating said mass into portions, placing one portion in contact with another while maintaining said temperature, and simultaneously densifying, molding and welding said portions by applying rolling pressure thereto.

7. A process for making molded articles of argillaceous material which consists in heating a mass of said material to a temperature at which it becomes somewhat plastic but not completely fused, densifying one portion of the loose hot material by applying pressure thereto, applying another portion of the loose hot material to said densified portion, and densifying said second portion while welding the same integrally with said first portion by applying pressure thereto.

8. A process for making molded articles of argillaceous material which consists in heating a mass of said material to a temperature at which it becomes somewhat plastic but not completely fused, rolling one portion of the loose hot material under pressure to compact and densify the material, applying another portion of the loose hot material to said densified portion, and rolling said second portion under pressure to compact and densify the loose material while welding the same to said first portion.

9. A process for making molded articles of argillaceous material which consists in heating a mass of said material to a temperature at which it becomes somewhat plastic but not completely fused, successively superimposing portions of the loose hot material on one another, and densifying and compacting the materials of each portion individually while welding the same to other portions by applying pressure individually to the loose hot materials of each superimposed portion.

10. A process for making articles of hot argillaceous material which consists in separating the loose hot material into portions, placing or distributing one portion on a mold or surface and densifying and molding it by application of pressure, then heating the top surface of that section of material in the mold, distributing another portion of said loose, hot, material on the hot surface of the section previously formed, and densifying and molding the material of said last portion by the application of pressure and simultaneously welding it to the section below, then reheating the top surface, distributing another portion of the loose hot material, and densifying, molding and welding as before and continuing until the article is build up to the desired thickness.

11. Apparatus for making products from a hot plastic or semi-plastic but not completely fused mass of argillaceous materials, comprising in combination a distributor having means for separating said mass into individual portions, and a plurality of means for applying densifying and molding pressure individually to said portions.

12. Apparatus for making products from a hot plastic or semi-plastic but not completely fused mass of argillaceous materials comprising in combination a distributor for separating said mass into individual portions, means for individually applying densifying and molding pressure to said portions, and means for maintaining the temperature of the hot materials.

13. Apparatus for making products from a hot plastic or semi-plastic but not completely fused mass of argillaceous materials, comprising in combination a distributor having adjustable means for separating said mass into individual portions variable in amount and means for individually applying densifying pressure to each portion.

14. Apparatus for making products from a hot plastic or semi-plastic but not completely fused mass of argillaceous material comprising in combination a distributor having adjustable means for separating said mass into individual portions variable in amount, a plurality of means for applying densifying and molding pressure individually to said portions, and means for maintaining the temperature of said hot mass.

15. Apparatus for making products from a hot plastic or semi-plastic but not completely fused mass of argillaceous material comprising in combination means for distributing said mass into separate portions, means for successively superimposing said portions on one another, and means for applying densifying and welding pressure successively to each superimposed portion.

16. Apparatus for making products from a hot plastic or semi-plastic but not completely fused mass of argillaceous material comprising in combination adjustable means for distributing said mass into separate portions variable in amount, means for successively superimposing said portions on one another, and means for applying densifying and welding pressure successively to each superimposed portion.

17. Apparatus for making products from a hot plastic or semi-plastic but not completely fused mass of argillaceous material comprising in combination means for distributing said mass into separate portions, a travelling support, means for successively feeding said portions to said support in superimposed position, and means for applying pressure successively to each superimposed portion.

18. Apparatus for making molded products from a hot plastic mass of argillaceous materials comprising in combination means for distributing a mass of said materials into separate portions, means for feeding materials to said distributing means, a support, means for feeding said portions successively to said support in superimposed position, and means for applying molding presure successively to each of said superimposed portions.

19. Apparatus for making products from a hot plastic mass of argillaceous materials comprising in combination a distributor inclined to the horizontal and having a plurality of separate passages for said materials, means for feeding materials to said distributor, a support, means for feeding materials from said passages successively to said support, and means for applying molding pressure to each successive portion of said materials.

20. Apparatus for making products from a hot plastic mass of argillaceous materials comprising in combination a distributor inclined to the horizontal and having a plurality of separate passages for said materials, means for feeding materials to said distributor, adjustable means for directing said materials to said separate passages, a support, means for feeding said materials from said passages successively to said support, and means for applying pressure to each successive portion of said materials fed to said support.

21. Apparatus for making products from a hot plastic mass of argillaceous materials comprising in combination a distributor inclined to the horizontal and having a plurality of separate paassages for said materials, means for feeding materials to said distributor, a support, means for feeding materials from said passages successively to said support, means for applying molding pressure to each successive portion of said materials, and means for heating said materials in said distributor.

22. Apparatus for making products from a hot plastic mass of argillaceous materials comprising in combination a distributor inclined to the horizontal and having a plurality of separate passages for said materials, means for feeding materials to said distributor, adjustable means for directing said materials to said separate passages, a support, means for feeding said materials from said passages successively to said support, means for applying pressure to each successive portion of said materials fed to said support, and means for heating said materials in said distributor and feeding means.

23. In apparatus of the class described, a distributor comprising a pan inclined to the horizontal, a plurality of walls tranversing said pan and forming a plurality of separate passages, means for discharging materials from the bottom of each passage, and means for heating materials in said passages.

24. In apparatus of the class described, a distributor comprising a pan inclined to the horizontal, a plurality of walls traversing said pan and forming a plurality of separate passages, said walls having adjustable end portions to regulate the amount of materials entering each passage, means for heating materials in said passages, and means for feeding materials from the lower ends of said passages.

25. In apparatus of the class described, a distributor comprising a pan inclined to the horizontal, a plurality of walls traversing said pan and forming a plurality of separate inclined passages, a cover for said pan, means positioned within said cover for heating materials in each of said passages, and means for discharging materials from the lower ends of said passages.

26. Apparatus of the class described comprising in combination a distributing pan inclined to the horizontal, walls traversing said pan and forming a plurality of separate inclined passages, a vertically disposed feeder at the lower end of each passage, a travelling support moving under the outlets of said feeders, and means associated with each feeder for applying pressure to materials delivered thereby on said support.

27. Apparatus of the class described comprising in combination a distributing pan inclined to the horizontal, walls traversing said pan and forming a plurality of separate inclined passages, a vertically disposed feeder at the lower end of each passage, a travelling support moving under the outlets of said feeders, means between successive feeders for heating materials on said support, and means associated with each feeder for applying pressure to materials on said support.

28. Apparatus of the class described comprising in combination a distributing pan inclined to the horizontal, walls traversing said pan and forming a plurality of separate inclined passages, a vertically disposed feeder at the lower end of each passage, a travelling support moving under the outlets of said feeders, heating means between successive feeders adapted to heat materials on said support, and a pressure roller associated with each feeder for rolling materials on said support.

29. Apparatus of the class described comprising in combination a distributing pan inclined to the horizontal, walls traversing said pan and forming a plurality of separate inclined passages, a vertically disposed feeder at the lower end of each passage, a travelling support moving under the outlets of said feeders, means associated with each feeder for applying pressure to materials delivered thereby on said support, and means for heating materials in said passages and feeders.

30. Apparatus of the class described comprising in combination a distributing pan inclined to the horizontal, walls traversing said pan and forming a plurality of separate inclined passages, said walls having adjustable end portions to regulate the amount of material in each passage, a vertically disposed feeder at the lower end of each passage, a travelling support moving under the outlets of said feeders, means between successive feeders for heating materials on said support, and means associated with each feeder for applying pressure to materials on said support.

In testimony whereof I have signed this specification.

WILLIAM B. PINE.